United States Patent
Keeling et al.

(10) Patent No.: US 9,815,381 B2
(45) Date of Patent: Nov. 14, 2017

(54) SYSTEMS, METHODS, AND APPARATUS FOR PARTIAL ELECTRONICS INTEGRATION IN VEHICLE PADS FOR WIRELESS POWER TRANSFER APPLICATIONS

(71) Applicant: QUALCOMM Incorporated, San Diego, CA (US)

(72) Inventors: Nicholas Athol Keeling, Auckland (NZ); Jonathan Beaver, Auckland (NZ); Edward Leonardus van Boheemen, Munich (DE); Michael Le Gallais Kissin, Auckland (NZ); Chang-Yu Huang, Auckland (NZ); Mickel Bipin Budhia, Auckland (NZ)

(73) Assignee: QUALCOMM Incorporated, San Diego, CA (US)

( * ) Notice: Subject to any disclaimer, the term of this patent is extended or adjusted under 35 U.S.C. 154(b) by 156 days.

(21) Appl. No.: 14/861,905

(22) Filed: Sep. 22, 2015

(65) Prior Publication Data

US 2016/0250932 A1    Sep. 1, 2016

Related U.S. Application Data

(60) Provisional application No. 62/126,356, filed on Feb. 27, 2015.

(51) Int. Cl.
*H02J 7/00* (2006.01)
*B60L 11/18* (2006.01)
(Continued)

(52) U.S. Cl.
CPC ......... *B60L 11/182* (2013.01); *B60L 11/1829* (2013.01); *H02J 7/0042* (2013.01);
(Continued)

(58) Field of Classification Search
CPC ........ B60L 11/182; H02J 7/0042; H02J 7/025
(Continued)

(56) References Cited

U.S. PATENT DOCUMENTS 6,559,562 B1 *  5/2003  Rostron ................ H02M 5/293
                                                          307/130
7,149,096 B2   12/2006  Batarseh et al.
(Continued)

FOREIGN PATENT DOCUMENTS

EP    2345553 A1   7/2011
EP    2763148 A1   8/2014
(Continued)

OTHER PUBLICATIONS

International Search Report and Written Opinion—PCT/US2016/016115 ISA/EPO—dated Apr. 25, 2016.

*Primary Examiner* — M'Baye Diao
(74) *Attorney, Agent, or Firm* — Knobbe, Martens, Olson & Bear, LLP

(57) ABSTRACT

Systems, methods, and apparatus for partial electronics integration in vehicle pads for wireless power transfer applications are provided. In one aspect, an apparatus for wirelessly receiving charging power is provided. The apparatus comprises a first enclosure including at least a receive coupler configured to generate an alternating current under the influence of an alternating magnetic field in a first enclosure. The first enclosure further includes a rectifier circuit configured to modify the alternating current to produce a direct current for output from the first enclosure to a controller circuit in a disparately located second enclosure. The apparatus further comprises at least one direct current inductor configured to receive the direct current from the rectifier circuit. In some implementations, the apparatus further comprises the controller circuit in the second enclo- (Continued)

sure. The controller circuit is configured to selectively provide the direct current to a battery.

30 Claims, 11 Drawing Sheets

(51) Int. Cl.
  *H02J 7/02* (2016.01)
  *H02J 50/10* (2016.01)
  *H01F 21/02* (2006.01)
(52) U.S. Cl.
  CPC ............ *H02J 7/0052* (2013.01); *H02J 7/025* (2013.01); *H02J 50/10* (2016.02); *H01F 21/02* (2013.01); *H02J 2007/0059* (2013.01)
(58) Field of Classification Search
  USPC .................................................. 320/108, 109
  See application file for complete search history.

(56) References Cited

U.S. PATENT DOCUMENTS

| | | | |
|---|---|---|---|
| 8,467,770 B1* | 6/2013 | Ben Ayed | H04L 63/107 |
| | | | 455/41.1 |
| 8,482,250 B2 | 7/2013 | Soar | |
| 8,643,326 B2 | 2/2014 | Campanella et al. | |
| 8,723,366 B2 | 5/2014 | Fiorello et al. | |
| 9,195,817 B2* | 11/2015 | Scully-Power | G06F 21/32 |
| 9,411,386 B2* | 8/2016 | Sauerwein, Jr. | G06F 21/00 |
| 9,436,220 B2* | 9/2016 | Rosenberg | G06F 1/1632 |
| 9,501,881 B2* | 11/2016 | Ahmad | G07C 9/00087 |
| 9,613,282 B2* | 4/2017 | Weiss | G07C 9/00158 |
| 9,626,258 B2* | 4/2017 | Halker | G06F 11/20 |
| 9,680,311 B2* | 6/2017 | Blood | H02J 5/005 |
| 2011/0018360 A1* | 1/2011 | Baarman | H02J 5/005 |
| | | | 307/104 |
| 2012/0313449 A1 | 12/2012 | Kurs et al. | |
| 2013/0049674 A1* | 2/2013 | Davis | B60L 11/182 |
| | | | 320/101 |
| 2013/0062966 A1* | 3/2013 | Verghese | H02J 7/025 |
| | | | 307/104 |
| 2013/0082536 A1* | 4/2013 | Taylor | H02J 7/025 |
| | | | 307/104 |
| 2014/0015328 A1 | 1/2014 | Beaver et al. | |
| 2014/0015522 A1 | 1/2014 | Widmer et al. | |
| 2014/0077616 A1* | 3/2014 | Baarman | H02J 5/005 |
| | | | 307/104 |
| 2014/0091756 A1* | 4/2014 | Ofstein | H02J 5/005 |
| | | | 320/108 |
| 2016/0096435 A1* | 4/2016 | Lee | B60L 11/182 |
| | | | 307/10.1 |
| 2016/0307380 A1* | 10/2016 | Ho | G07C 9/00079 |

FOREIGN PATENT DOCUMENTS

| | | |
|---|---|---|
| EP | 2763149 A1 | 8/2014 |
| JP | 2007252027 A | 9/2007 |
| WO | WO-2007139401 A2 | 12/2007 |
| WO | WO-2013141717 A1 | 9/2013 |

* cited by examiner

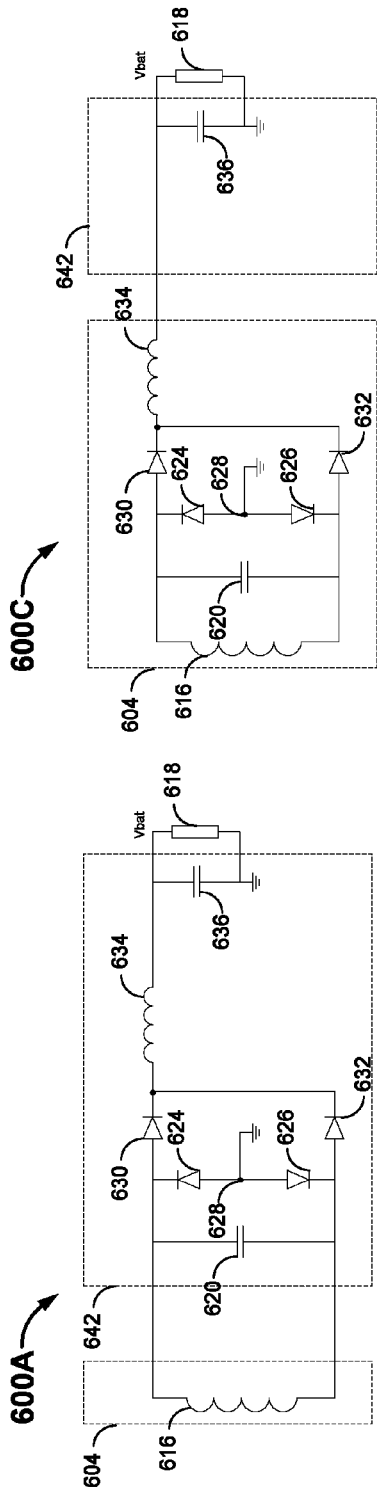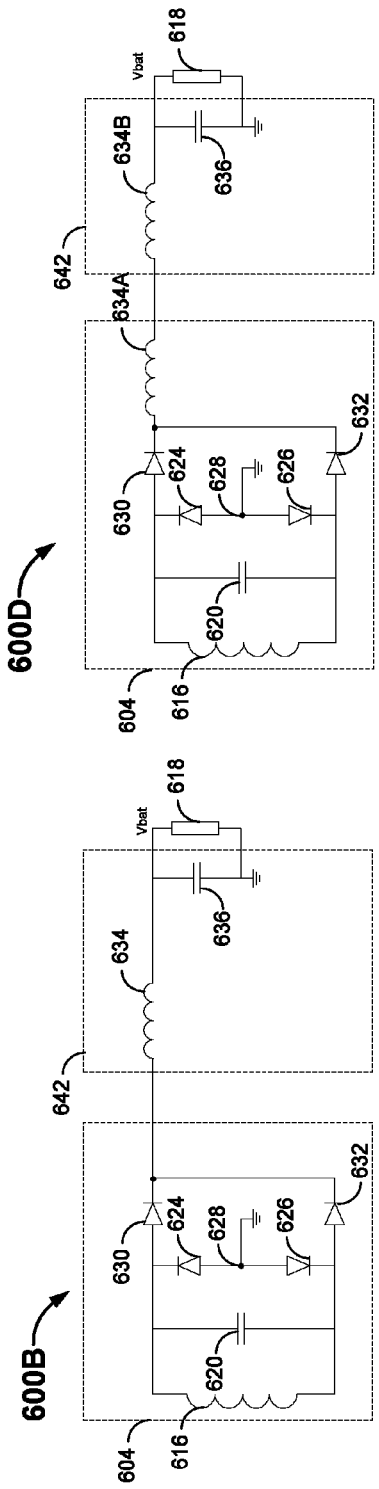

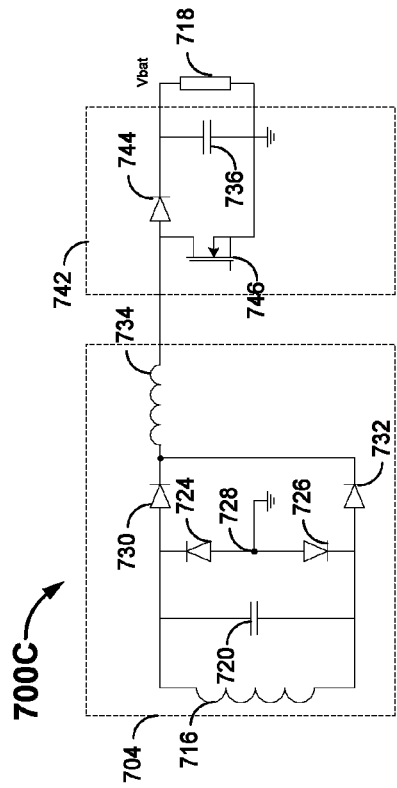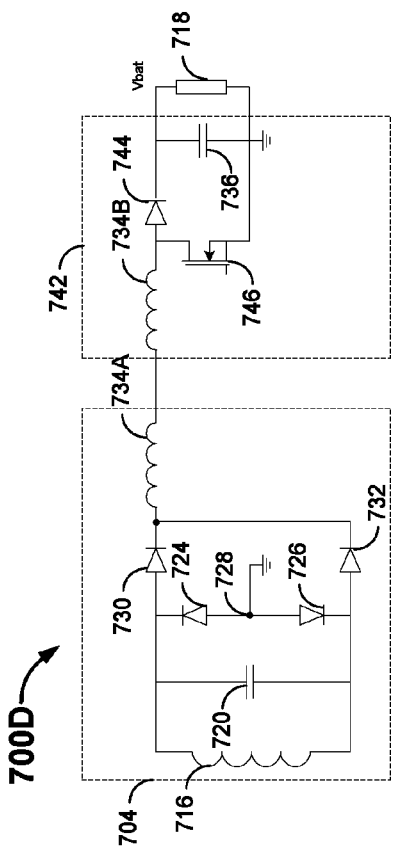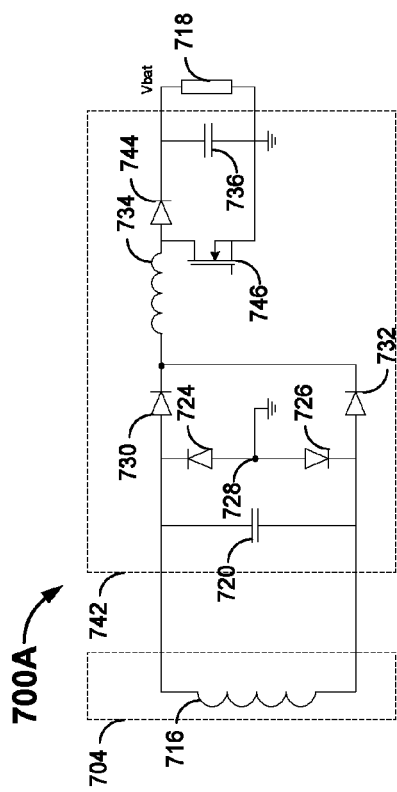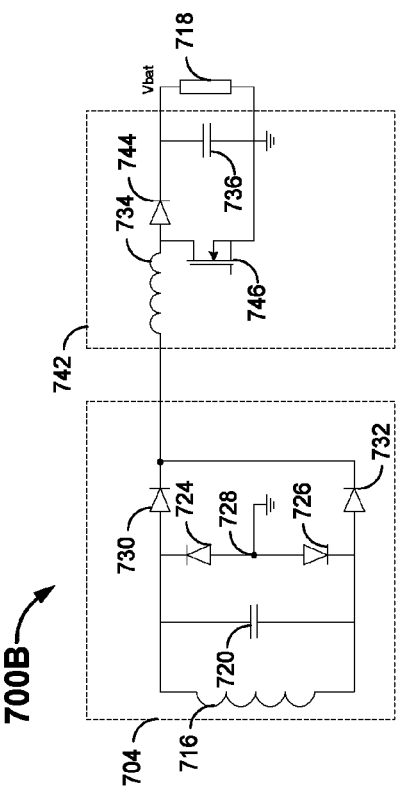
FIG. 7C
FIG. 7D
FIG. 7A
FIG. 7B

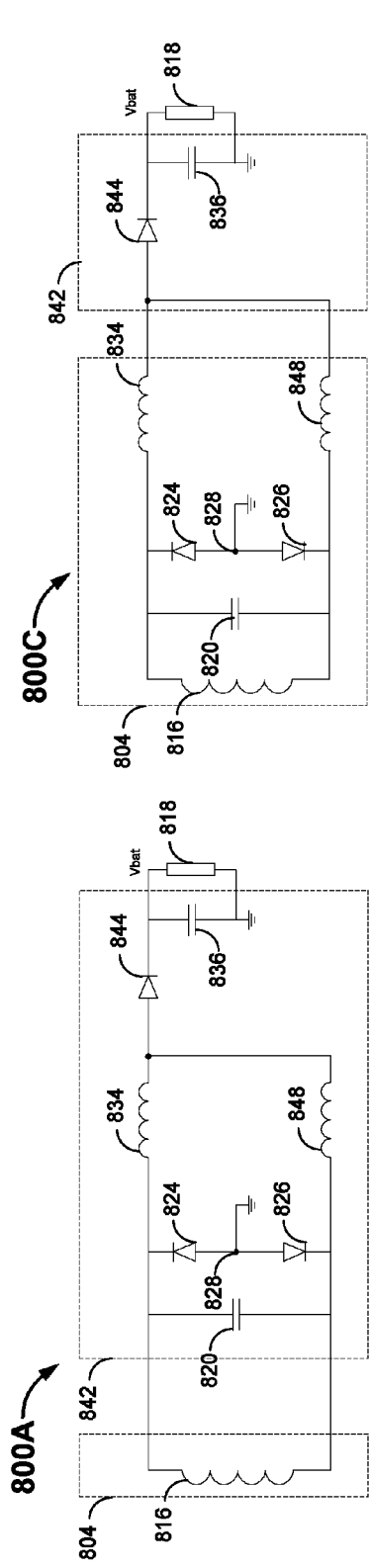
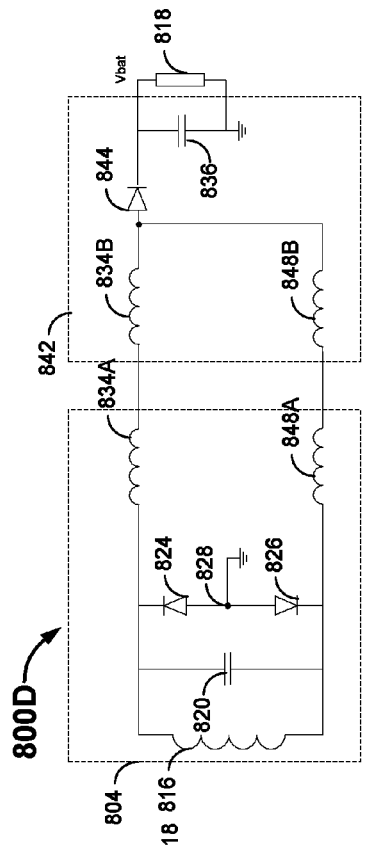
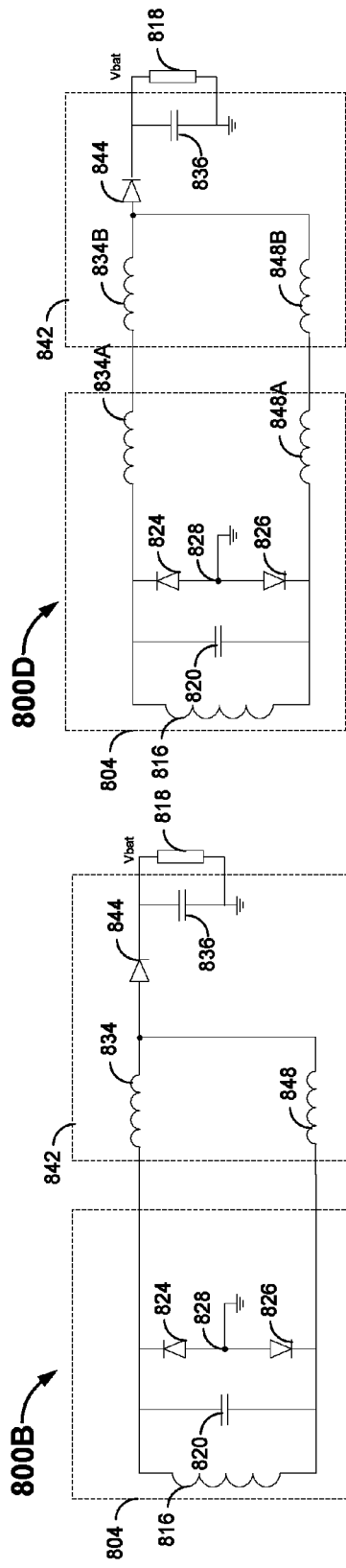
FIG. 8C
FIG. 8D
FIG. 8A
FIG. 8B

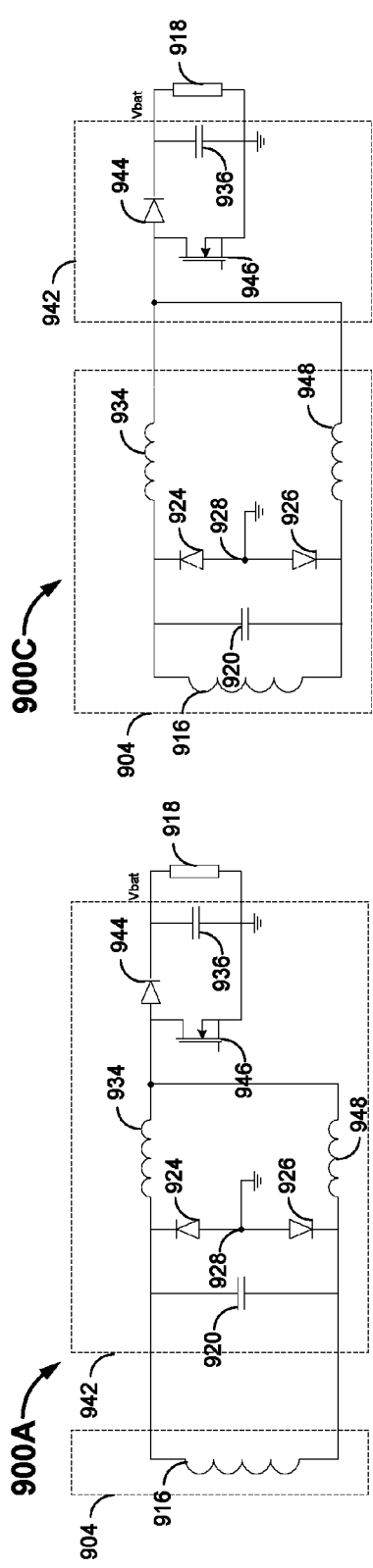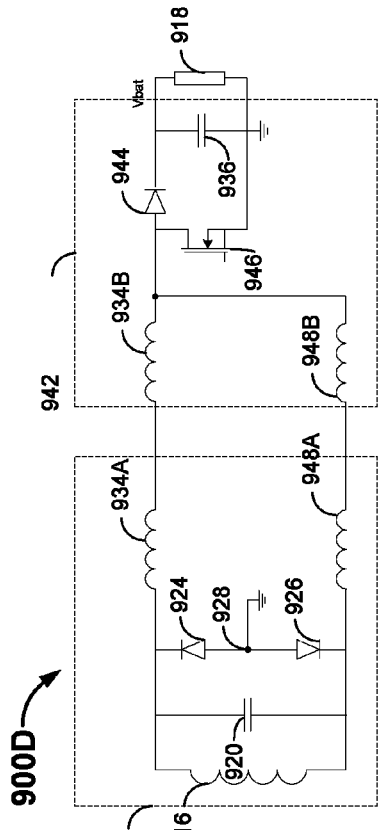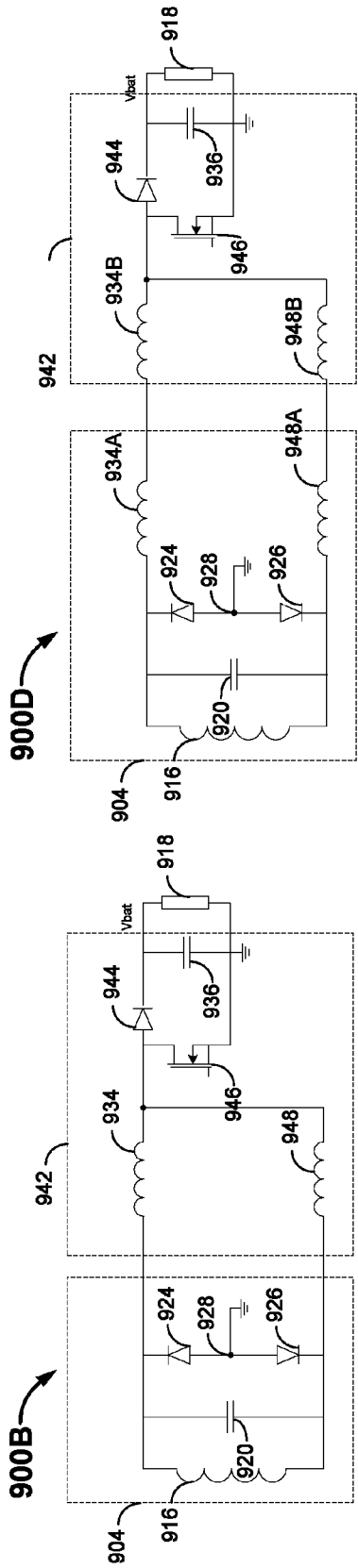
FIG. 9A FIG. 9B FIG. 9C FIG. 9D

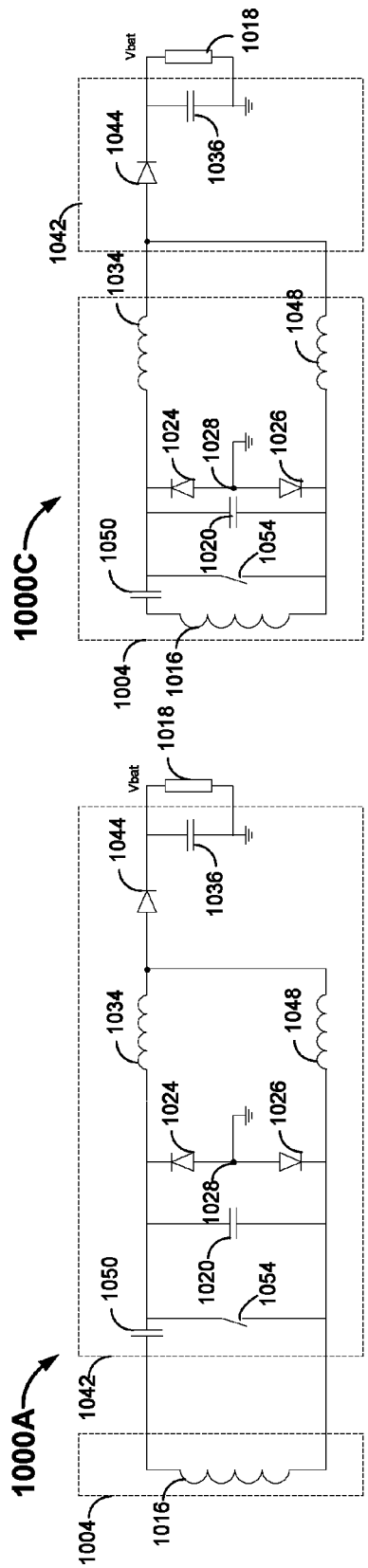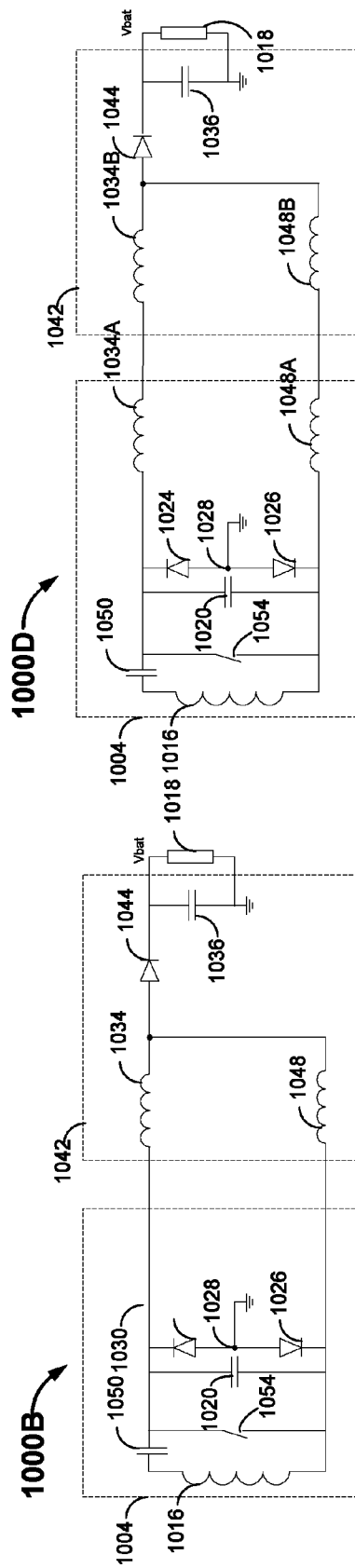
FIG. 10A
FIG. 10B
FIG. 10C
FIG. 10D

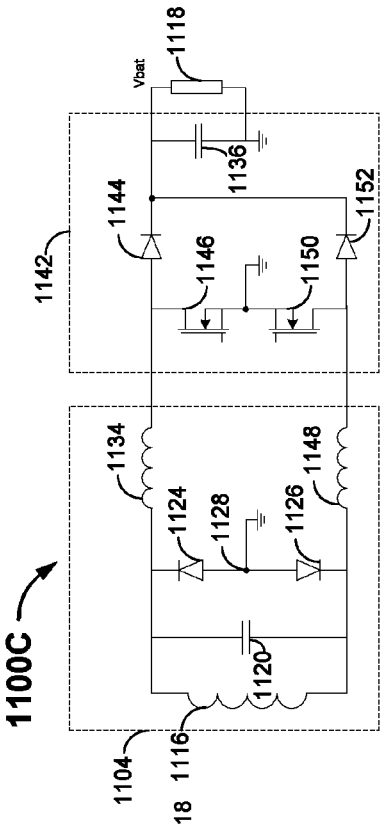
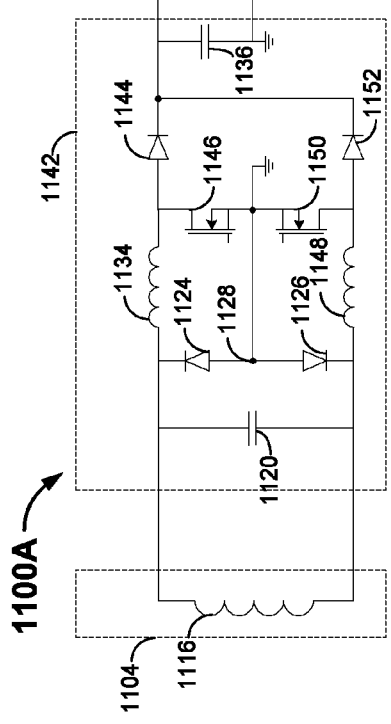
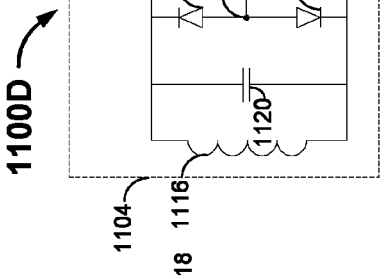
FIG. 11A  FIG. 11B  FIG. 11C  FIG. 11D

SYSTEMS, METHODS, AND APPARATUS FOR PARTIAL ELECTRONICS INTEGRATION IN VEHICLE PADS FOR WIRELESS POWER TRANSFER APPLICATIONS

CROSS REFERENCE TO RELATED APPLICATIONS

This application claims priority to and the benefit under 35 U.S.C. §119(e) of U.S. Provisional Patent Application No. 62/126,356 entitled "SYSTEMS, METHODS, AND APPARATUS FOR PARTIAL ELECTRONICS INTEGRATION IN VEHICLE PADS FOR WIRELESS POWER TRANSFER APPLICATIONS" filed on Feb. 27, 2015, the disclosure of which is hereby incorporated by reference in its entirety.

FIELD

The present disclosure relates generally to wireless power transfer, and more specifically to systems, methods and apparatuses for partial electronics integration in vehicle pads for wireless power transfer applications.

BACKGROUND

Inductive power transfer (IPT) systems provide one example of wireless transfer of energy. In IPT systems, a primary power device (or "transmitter") transmits power wirelessly to a secondary power device (or "receiver"). Each of the transmitter and receiver includes an inductive coupler, typically a single or multi-coil arrangement of windings comprising electric current conveying materials, such as Litz wire. An alternating current passing through a primary coupler produces an alternating magnetic field. When a secondary coupler is placed in proximity to the primary coupler, the alternating magnetic field induces an electromotive force (EMF) in the secondary coupler according to Faraday's law, thereby wirelessly transferring power to the receiver.

Electrically chargeable vehicles incorporating IPT systems may have very limited space for installing required charging and control circuitry for the receiver system. Often a single location is not available for installing all of this circuitry. As such, systems, methods and apparatuses for partial electronics integration in vehicle pads for wireless power transfer applications are desirable.

SUMMARY

Some implementations provide an apparatus for wirelessly receiving charging power. The apparatus comprises a first enclosure including at least a receive coupler configured to generate an alternating current under the influence of an alternating magnetic field in a first enclosure. The first enclosure includes a rectifier circuit configured to modify the alternating current to produce a direct current for output from the first enclosure to a controller circuit in a disparately located second enclosure.

Some other implementations provide a method for wirelessly receiving charging power. The method comprises generating, within a first enclosure, an alternating current under the influence of an alternating magnetic field. The method comprises modifying, within the first enclosure, the alternating current to produce a direct current. The method comprises outputting the direct current from the first enclosure to a controller circuit in a disparately located second enclosure.

Yet other implementations provide a non-transitory, computer-readable medium comprising code that, when executed, causes an apparatus for wirelessly receiving charging power to generate, within a first enclosure, an alternating current under the influence of an alternating magnetic field. The code, when executed, further causes the apparatus to modify, within the first enclosure, the alternating current to produce a direct current. The code, when executed, further causes the apparatus to output the direct current from the first enclosure to a controller circuit in a disparately located second enclosure.

Yet other implementations provide an apparatus for wirelessly receiving charging power. The apparatus comprises first enclosing means. The first enclosing means encloses means for generating an alternating current under the influence of an alternating magnetic field in a first enclosure. The first enclosing means encloses means for modifying the alternating current to produce a direct current. The direct current is for output from the first enclosing means to means for controlling the apparatus. The means for controlling the apparatus is disposed in disparately located second enclosing means.

BRIEF DESCRIPTION OF THE DRAWINGS

FIG. 6A-6D are schematic diagrams of different arrangements of components in each of a vehicle pad enclosure and a vehicle controller enclosure of a wireless charging power receiver, in accordance with some implementations.

FIG. 7A-7D are schematic diagrams of different arrangements of components in each of a vehicle pad enclosure and a vehicle controller enclosure of a wireless charging power receiver, in accordance with some implementations.

FIG. 8A-8D are schematic diagrams of different arrangements of components in each of a vehicle pad enclosure and a vehicle controller enclosure of a wireless charging power receiver, in accordance with some implementations.

FIG. 9A-9D are schematic diagrams of different arrangements of components in each of a vehicle pad enclosure and a vehicle controller enclosure of a wireless charging power receiver, in accordance with some implementations.

FIG. 10A-10D are schematic diagrams of different arrangements of components in each of a vehicle pad enclosure and a vehicle controller enclosure of a wireless charging power receiver, in accordance with some implementations.

FIG. 11A-11D are schematic diagrams of different arrangements of components in each of a vehicle pad enclosure and a vehicle controller enclosure of a wireless charging power receiver, in accordance with some implementations.

DETAILED DESCRIPTION

The detailed description set forth below in connection with the appended drawings is intended as a description of implementations and is not intended to represent the only implementations. The detailed description includes specific details for the purpose of providing a thorough understanding of the implementations. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include, besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

Figure 1:
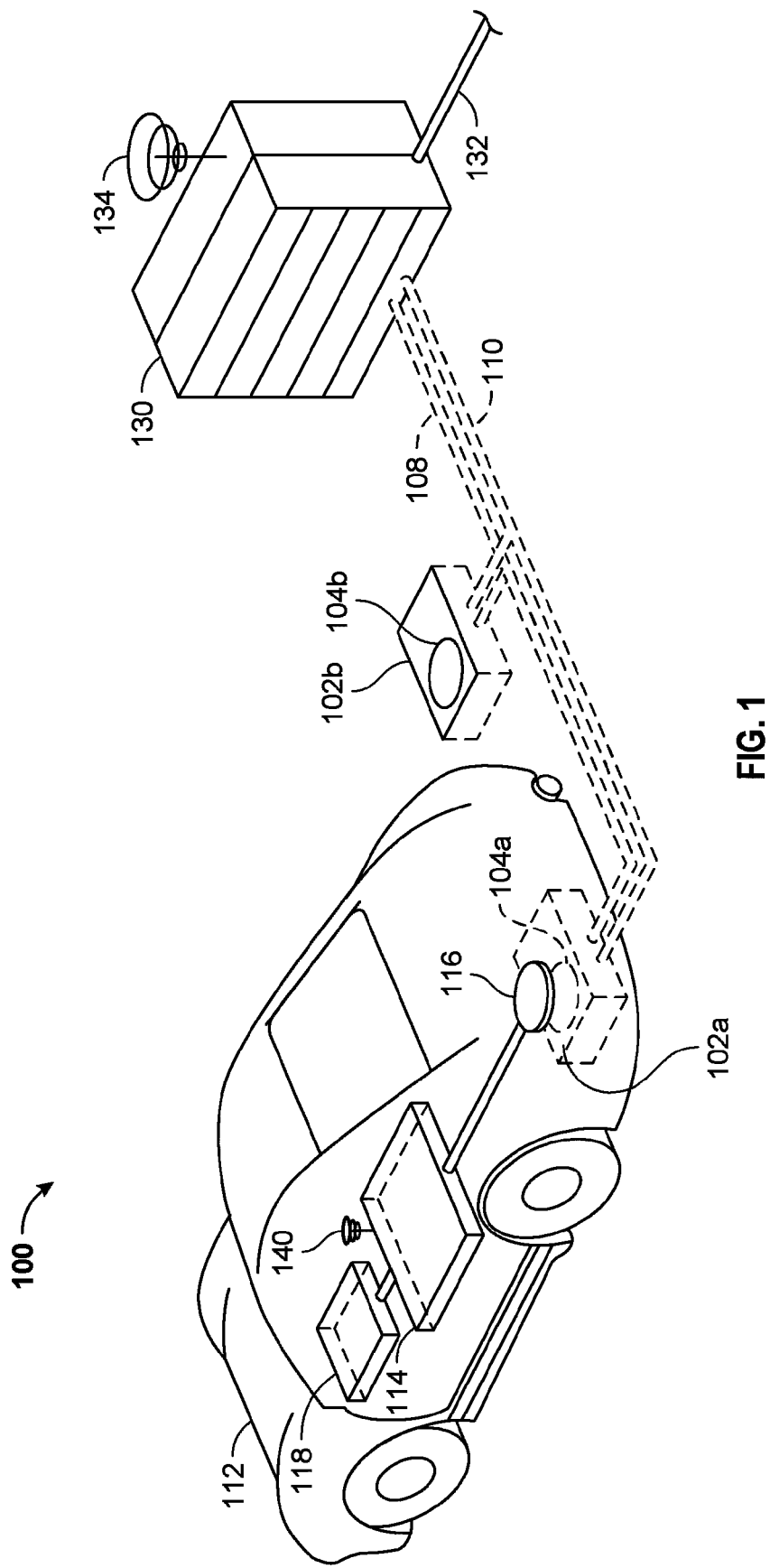
FIG. 1 illustrates a wireless power transfer system for charging an electric vehicle, in accordance with some implementations.

FIG. 1 is a diagram of a wireless power transfer system 100 for charging an electric vehicle, in accordance with some implementations. The wireless power transfer system 100 enables charging of an electric vehicle 112 while the electric vehicle 112 is parked so as to efficiently couple with a base wireless charging system 102a. Spaces for two electric vehicles are illustrated in a parking area to be parked over corresponding base wireless charging systems 102a and 102b. In some implementations, a local distribution center 130 may be connected to a power backbone 132 and configured to provide an alternating current (AC) or a direct current (DC) supply through a power link 110 to the base wireless charging systems 102a and 102b. Each of the base wireless charging systems 102a and 102b also includes a base coupler 104a and 104b, respectively, for wirelessly transferring power. In some other implementations (not shown in FIG. 1), base couplers 104a or 104b may be stand-alone physical units and are not part of the base wireless charging system 102a or 102b.

The electric vehicle 112 may include a battery unit 118, an electric vehicle coupler 116, and an electric vehicle wireless charging unit 114. The electric vehicle wireless charging unit 114 and the electric vehicle coupler 116 constitute the electric vehicle wireless charging system. In some diagrams shown herein, the electric vehicle wireless charging unit 114 is also referred to as the vehicle charging unit (VCU). The electric vehicle coupler 116 may interact with the base coupler 104a for example, via a region of the electromagnetic field generated by the base coupler 104a.

In some implementations, the electric vehicle coupler 116 may receive power when the electric vehicle coupler 116 is located in an electromagnetic field produced by the base coupler 104a. The field may correspond to a region where energy output by the base coupler 104a may be captured by the electric vehicle coupler 116. For example, the energy output by the base coupler 104a may be at a level sufficient to charge or power the electric vehicle 112. In some cases, the field may correspond to a "near-field" of the base coupler 104a. The near-field may correspond to a region in which there are strong reactive fields resulting from the currents and charges in the base coupler 104a that do not radiate power away from the base coupler 104a. In some cases the near-field may correspond to a region that is within about $1/2\pi$ of a wavelength of the a frequency of the electromagnetic field produced by the base coupler 104a distant from the base coupler 104a, as will be further described below.

Local distribution center 130 may be configured to communicate with external sources (e.g., a power grid) via a communication backhaul 134, and with the base wireless charging system 102a via a communication link 108.

In some implementations the electric vehicle coupler 116 may be aligned with the base coupler 104a and, therefore, disposed within a near-field region simply by the electric vehicle operator positioning the electric vehicle 112 such that the electric vehicle coupler 116 is sufficiently aligned relative to the base coupler 104a. Alignment may be considered sufficient when an alignment error has fallen below a tolerable value. In other implementations, the operator may be given visual and/or auditory feedback to determine when the electric vehicle 112 is properly placed within a tolerance area for wireless power transfer. In yet other implementations, the electric vehicle 112 may be positioned by an autopilot system, which may move the electric vehicle 112 until the sufficient alignment is achieved. This may be performed automatically and autonomously by the electric vehicle 112 with or without driver intervention. This may be possible for an electric vehicle 112 that is equipped with a servo steering, radar sensors (e.g., ultrasonic sensors), and intelligence for safely maneuvering and adjusting the electric vehicle. In still other implementations, the electric vehicle 112 and/or the base wireless charging system 102a may have functionality for mechanically displacing and moving the couplers 116 and 104a, respectively, relative to each other to more accurately orient or align them and develop sufficient and/or otherwise more efficient coupling there between.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention or manipulation thereby improving convenience to a user. There may also be no exposed electrical contacts and no mechanical wear out, thereby improving reliability of the wireless power transfer system 100. Safety may be improved since manipulations with cables and connectors may not be needed and there may be no cables, plugs, or sockets to be exposed to moisture in an outdoor environment. In addition, there may also be no visible or accessible sockets, cables, or plugs, thereby reducing potential vandalism of power charging devices. Further, since the electric vehicle 112 may be used as distributed storage devices to stabilize a power grid, a convenient docking-to-grid solution may help to increase availability of vehicles for vehicle-to-grid (V2G) operation.

The wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that either the base wireless charging system 102a can transmit power to the electric vehicle 112 or the electric vehicle 112 can transmit power to the base wireless charging system 102a. This capability may be useful to stabilize the power distribution grid by allowing electric vehicles 112 to contribute power to the overall distribution system in times of energy shortfall caused by over demand or shortfall in renewable energy production (e.g., wind or solar).

Figure 2:
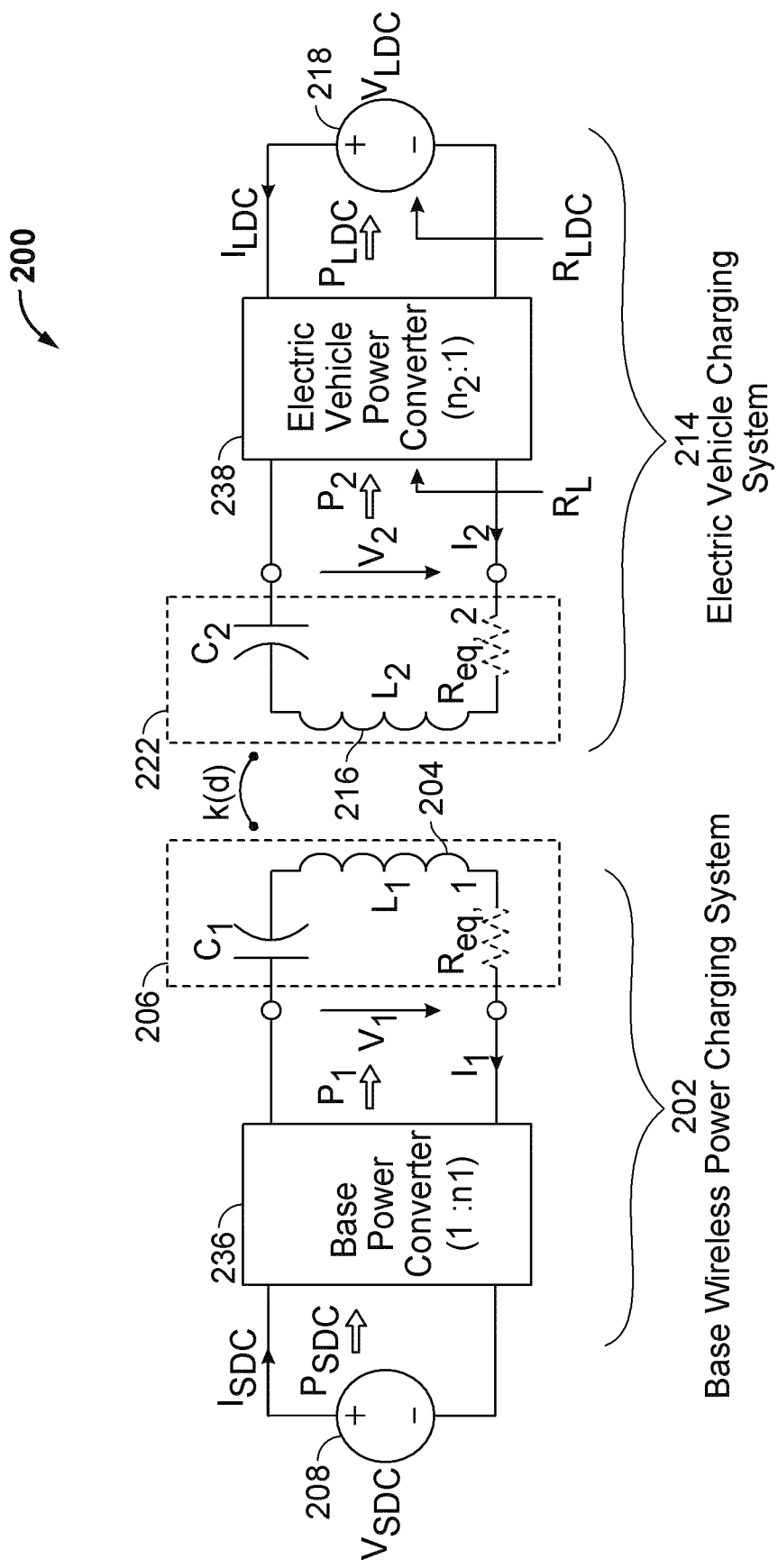
FIG. 2 is a schematic diagram of core components of a wireless power transfer system similar to that previously discussed in connection with FIG. 1, in accordance with some implementations.

FIG. 2 is a schematic diagram of core components of a wireless power transfer system 200 similar to that previously discussed in connection with FIG. 1, in accordance with some implementations. The wireless power transfer system 200 may include a base resonant circuit 206 including a base coupler 204 having an inductance $L_1$. The wireless power transfer system 200 further includes an electric vehicle resonant circuit 222 including an electric vehicle coupler 216 having an inductance $L_2$. Implementations described herein may use capacitively loaded conductor loops (i.e., multi-turn coils) forming a resonant structure that is capable of efficiently coupling energy from a primary structure (transmitter) to a secondary structure (receiver) via a magnetic or electromagnetic near-field if both the transmitter and the receiver are tuned to a common resonant frequency. The coils may be used for the electric vehicle coupler 216 and the base coupler 204. Using resonant structures for coupling energy may be referred to as "magnetically coupled resonance," "electromagnetically coupled resonance," and/or "resonant induction." The operation of the wireless power transfer system 200 will be described based on power transfer from a base coupler 204 to an electric vehicle 112 (not shown), but is not limited thereto. For example, as discussed above, energy may be also transferred in the reverse direction.

With reference to FIG. 2, a power supply 208 (e.g., AC or DC) supplies power $P_{SDC}$ to the base power converter 236 as part of the base wireless power charging system 202 to transfer energy to an electric vehicle (e.g., electric vehicle 112 of FIG. 1). The base power converter 236 may include circuitry such as an AC-to-DC converter configured to convert power from standard mains AC to DC power at a suitable voltage level, and a DC-to-low frequency (LF) converter configured to convert DC power to power at an operating frequency suitable for wireless high power transfer. The base power converter 236 supplies power $P_1$ to the base resonant circuit 206 including tuning capacitor $C_1$ in series with base coupler 204 to emit an electromagnetic field at the operating frequency. The series-tuned resonant circuit 206 should be construed as examples. In another implementation, the capacitor $C_1$ may be coupled with the base coupler 204 in parallel. In yet other implementations, tuning may be formed of several reactive elements in any combination of parallel or series topology. The capacitor $C_1$ may be provided to form a resonant circuit with the base coupler 204 that resonates substantially at the operating frequency. The base coupler 204 receives the power $P_1$ and wirelessly transmits power at a level sufficient to charge or power the electric vehicle. For example, the level of power provided wirelessly by the base coupler 204 may be on the order of kilowatts (kW) (e.g., anywhere from 1 kW to 110 kW, although actual levels may be or higher or lower).

The base resonant circuit 206 (including the base coupler 204 and tuning capacitor $C_1$) and the electric vehicle resonant circuit 222 (including the electric vehicle coupler 216 and tuning capacitor $C_2$) may be tuned to substantially the same frequency. The electric vehicle coupler 216 may be positioned within the near-field of the base coupler and vice versa, as further explained below. In this case, the base coupler 204 and the electric vehicle coupler 216 may become coupled to one another such that power may be transferred wirelessly from the base coupler 204 to the electric vehicle coupler 216. The series capacitor $C_2$ may be provided to form a resonant circuit with the electric vehicle coupler 216 that resonates substantially at the operating frequency. The series-tuned resonant circuit 222 should be construed as examples. In another implementation, the capacitor $C_2$ may be coupled with the electric vehicle coupler 216 in parallel. In yet other implementations, the electric vehicle resonant circuit 222 may be formed of several reactive elements in any combination of parallel or series topology. Element k(d) represents the mutual coupling coefficient resulting at coil separation d. Equivalent resistances $R_{eq,1}$ and $R_{eq,2}$ represent the losses that may be inherent to the base and electric vehicle couplers 204 and 216 and the tuning (anti-reactance) capacitors $C_1$ and $C_2$, respectively. The electric vehicle resonant circuit 222, including the electric vehicle coupler 216 and capacitor $C_2$, receives and provides the power $P_2$ to an electric vehicle power converter 238 of an electric vehicle charging system 214.

The electric vehicle power converter 238 may include, among other things, a LF-to-DC converter configured to convert power at an operating frequency back to DC power at a voltage level of the load 218 that may represent the electric vehicle battery unit. The electric vehicle power converter 238 may provide the converted power $P_{LDC}$ to the load 218. The power supply 208, base power converter 236, and base coupler 204 may be stationary and located at a variety of locations as discussed above. The electric vehicle load 218 (e.g., the electric vehicle battery unit), electric vehicle power converter 238, and electric vehicle coupler 216 may be included in the electric vehicle charging system 214 that is part of the electric vehicle (e.g., electric vehicle 112) or part of its battery pack (not shown). The electric vehicle charging system 214 may also be configured to provide power wirelessly through the electric vehicle coupler 216 to the base wireless power charging system 202 to feed power back to the grid. Each of the electric vehicle coupler 216 and the base coupler 204 may act as transmit or receive couplers based on the mode of operation.

While not shown, the wireless power transfer system 200 may include a load disconnect unit (LDU) (not shown) to safely disconnect the electric vehicle load 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle coupler 216 to the electric vehicle power converter 238. Disconnecting the electric vehicle coupler 216 may suspend charging and also may change the "load" as "seen" by the base wireless power charging system 202 (acting as a transmitter), which may be used to "cloak" the electric vehicle charging system 214 (acting as the receiver) from the base wireless charging system 202. The load changes may be detected if the transmitter includes a load sensing circuit. Accordingly, the transmitter, such as the base wireless charging system 202, may have a mechanism for determining when receivers, such as the electric vehicle charging system 214, are present in the near-field coupling mode region of the base coupler 204 as further explained below.

As described above, in operation, during energy transfer towards an electric vehicle (e.g., electric vehicle 112 of FIG. 1), input power is provided from the power supply 208 such that the base coupler 204 generates an electromagnetic field for providing the energy transfer. The electric vehicle coupler 216 couples to the electromagnetic field and generates output power for storage or consumption by the electric vehicle 112. As described above, in some implementations, the base resonant circuit 206 and electric vehicle resonant circuit 222 are configured and tuned according to a mutual resonant relationship such that they are resonating nearly or substantially at the operating frequency. Transmission losses between the base wireless power charging system 202 and electric vehicle charging system 214 are minimal when the electric vehicle coupler 216 is located in the near-field coupling mode region of the base coupler 204 as further explained below.

As stated, an efficient energy transfer occurs by transferring energy via an magnetic near-field rather than via electromagnetic waves in the far field, which may involve substantial losses due to radiation into space. When in the near-field, a coupling mode may be established between the transmit coupler and the receive coupler. The space around the couplers where this near-field coupling may occur is referred to herein as a near-field coupling mode region.

While not shown, the base power converter 236 and the electric vehicle power converter 238 if bidirectional may both include, for the transmit mode, an oscillator, a driver circuit such as a power amplifier, a filter and matching circuit, and for the receive mode a rectifier circuit. The oscillator may be configured to generate a desired operating frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance as presented by the resonant circuits 206 and 222 to the base and electric vehicle power converters 236 and 238, respectively. For the receive mode, the base and electric vehicle power converters 236 and 238 may also include a rectifier and switching circuitry.

The electric vehicle coupler 216 and base coupler 204 as described throughout the disclosed implementations may be referred to or configured as "conductor loops", and more specifically, "multi-turn conductor loops" or coils. The base and electric vehicle couplers 204 and 216 may also be referred to herein or be configured as "magnetic" couplers. The term "coupler" is intended to refer to a component that may wirelessly output or receive energy for coupling to another "coupler."

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency.

A resonant frequency may be based on the inductance and capacitance of a resonant circuit (e.g. resonant circuit 206) including a coupler (e.g., the base coupler 204 and capacitor $C_2$) as described above. As shown in FIG. 2, inductance may generally be the inductance of the coupler, whereas, capacitance may be added to the coupler to create a resonant structure at a desired resonant frequency. Accordingly, for larger size couplers using larger diameter coils exhibiting larger inductance, the value of capacitance needed to produce resonance may be lower. Inductance may also depend on a number of turns of a coil. Furthermore, as the size of the coupler increases, coupling efficiency may increase. This is mainly true if the size of both base and electric vehicle couplers increase. Furthermore a resonant circuit including a coupler and tuning capacitor may be designed to have a high quality (Q) factor to improve energy transfer efficiency. For example, the Q factor may be 300 or greater.

As described above, according to some implementations, coupling power between two couplers that are in the near-field of one another is disclosed. As described above, the near-field may correspond to a region around the coupler in which mainly reactive electromagnetic fields exist. If the physical size of the coupler is much smaller than the wavelength, inversely proportional to the frequency, there is no substantial loss of power due to waves propagating or radiating away from the coupler. Near-field coupling-mode regions may correspond to a volume that is near the physical volume of the coupler, typically within a small fraction of the wavelength. According to some implementations, magnetic couplers, such as single and multi-turn conductor loops, are preferably used for both transmitting and receiving since handling magnetic fields in practice is easier than electric fields because there is less interaction with foreign objects, e.g., dielectric objects and the human body. Nevertheless, "electric" couplers (e.g., dipoles and monopoles) or a combination of magnetic and electric couplers may be used.

Figure 3:
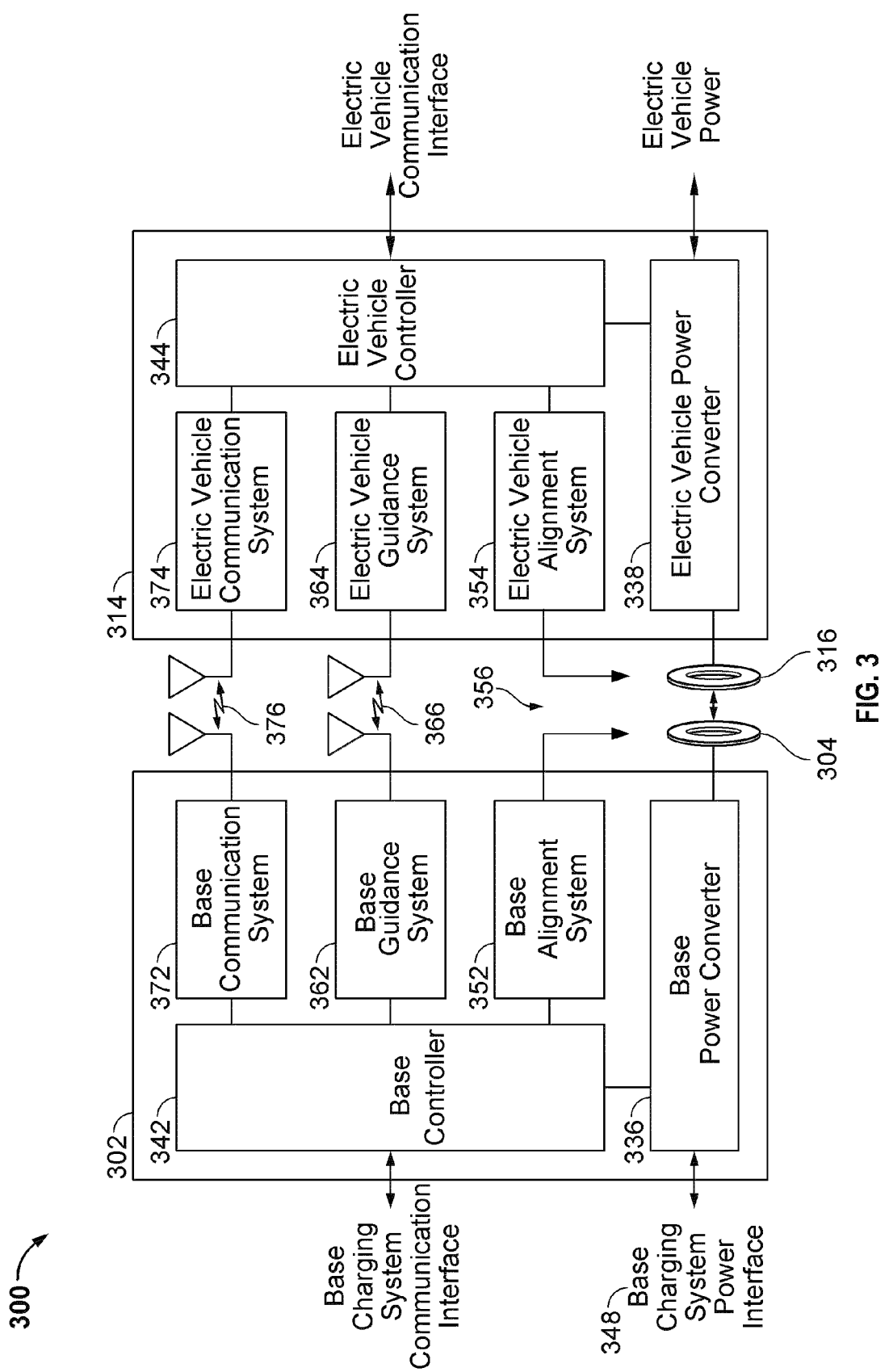
FIG. 3 is a functional block diagram showing core and ancillary components of the wireless power transfer system of FIG. 1.

FIG. 3 is a functional block diagram showing components of wireless power transfer system 300, which may be employed in wireless power transfer system 100 of FIG. 1 and/or that wireless power transfer system 200 of FIG. 2 may be part of. The wireless power transfer system 300 illustrates a communication link 376, a guidance link 366, using, for example, a magnetic field signal for determining a position or direction, and an alignment mechanism 356 capable of mechanically moving one or both of the base coupler 304 and the electric vehicle coupler 316. Mechanical (kinematic) alignment of the base coupler 304 and the electric vehicle coupler 316 may be controlled by the base alignment system 352 and the electric vehicle charging alignment system 354, respectively. The guidance link 366 may be capable of bi-directional signaling, meaning that guidance signals may be emitted by the base guidance system or the electric vehicle guidance system or by both. As described above with reference to FIG. 1, when energy flows towards the electric vehicle 112, in FIG. 3 a base charging system power interface 348 may be configured to provide power to a base power converter 336 from a power source, such as an AC or DC power supply (not shown). The base power converter 336 may receive AC or DC power via the base charging system power interface 348 to drive the base coupler 304 at a frequency near or at the resonant frequency of the base resonant circuit 206 with reference to FIG. 2. The electric vehicle coupler 316, when in the near-field coupling-mode region, may receive energy from the electromagnetic field to oscillate at or near the resonant frequency of the electric vehicle resonant circuit 222 with reference to FIG. 2. The electric vehicle power converter 338 converts the oscillating signal from the electric vehicle coupler 316 to a power signal suitable for charging a battery via the electric vehicle power interface.

The base wireless charging system 302 includes a base controller 342 and the electric vehicle charging system 314 includes an electric vehicle controller 344. The base controller 342 may provide a base charging system communication interface to other systems (not shown) such as, for example, a computer, a base common communication (BCC), a communications entity of the power distribution center, or a communications entity of a smart power grid. The electric vehicle controller 344 may provide an electric vehicle communication interface to other systems (not shown) such as, for example, an on-board computer on the vehicle, a battery management system, other systems within the vehicles, and remote systems.

The base communication system 372 and electric vehicle communication system 374 may include subsystems or modules for specific application with separate communication channels and also for wirelessly communicating with other communications entities not shown in the diagram of FIG. 3. These communications channels may be separate physical channels or separate logical channels. As non-limiting examples, a base alignment system 352 may communicate with an electric vehicle alignment system 354 through communication link 376 to provide a feedback mechanism for more closely aligning the base coupler 304 and the electric vehicle coupler 316, for example via autonomous mechanical (kinematic) alignment, by either the electric vehicle alignment system 352 or the base alignment system 352, or by both, or with operator assistance as described herein. Similarly, a base guidance system 362 may communicate with an electric vehicle guidance system 364 through communication link 376 and also using a guidance link 366 for determining a position or direction as needed to guide an operator to the charging spot and in aligning the base coupler 304 and electric vehicle coupler 316. In some implementations, communications link 376 may comprise a plurality of separate, general-purpose communication channels supported by base communication system 372 and electric vehicle communication system 374 for communicating other information between the base wireless charging system 302 and the electric vehicle charging system 314. This information may include information about electric vehicle characteristics, battery characteristics, charging status, and power capabilities of both the base wireless charging system 302 and the electric vehicle charging system 314, as well as maintenance and diagnostic data for the electric vehicle. These communication channels may be separate logical channels or separate physical communication channels such as, for example, WLAN, Bluetooth, zigbee, cellular, etc.

In some implementations, electric vehicle controller 344 may also include a battery management system (BMS) (not shown) that manages charge and discharge of the electric vehicle principal and/or auxiliary battery. As discussed herein, base guidance system 362 and electric vehicle guidance system 364 include the functions and sensors as needed for determining a position or direction, e.g., based on microwave, ultrasonic radar, or magnetic vectoring principles. Further, electric vehicle controller 344 may be configured to communicate with electric vehicle onboard systems. For example, electric vehicle controller 344 may provide, via the electric vehicle communication interface, position data, e.g., for a brake system configured to perform a semi-automatic parking operation, or for a steering servo system configured to assist with a largely automated parking ("park by wire") that may provide more convenience and/or higher parking accuracy as may be needed in certain applications to provide sufficient alignment between base and electric vehicle couplers 304 and 316. Moreover, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

The wireless power transfer system 300 may include other ancillary systems such as detection and sensor systems (not shown). For example, the wireless power transfer system 300 may include sensors for use with systems to determine a position as required by the guidance system (362, 364) to properly guide the driver or the vehicle to the charging spot, sensors to mutually align the couplers with the required separation/coupling, sensors to detect objects that may obstruct the electric vehicle coupler 316 from moving to a particular height and/or position to achieve coupling, and safety sensors for use with systems to perform a reliable, damage free, and safe operation of the system. For example, a safety sensor may include a sensor for detection of presence of animals or children approaching the base and electric vehicle couplers 304, 316 beyond a safety radius, detection of metal objects located near or in proximity of the base or electric vehicle coupler (304, 316) that may be heated up (induction heating), and for detection of hazardous events such as incandescent objects near the base or electric vehicle coupler (304, 316).

The wireless power transfer system 300 may also support plug-in charging via a wired connection, for example, by providing a wired charge port (not shown) at the electric vehicle charging system 314. The electric vehicle charging system 314 may integrate the outputs of the two different chargers prior to transferring power to or from the electric vehicle. Switching circuits may provide the functionality as needed to support both wireless charging and charging via a wired charge port.

To communicate between the base wireless charging system 302 and the electric vehicle charging system 314, the wireless power transfer system 300 may use in-band signaling via base and electric vehicle couplers 304, 316 and/or out-of-band signaling via communications systems (372, 374), e.g., via an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

Figure 4:
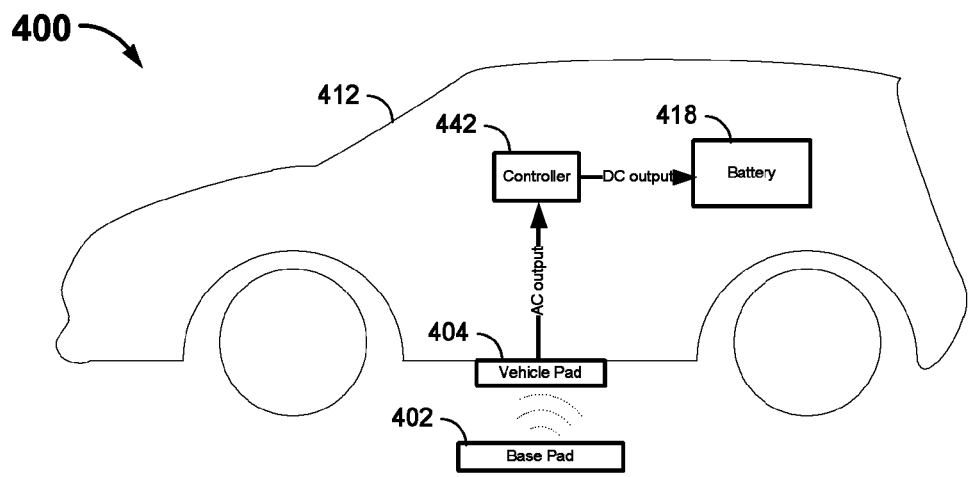
FIG. 4 is a functional block diagram of a vehicle including a vehicle pad enclosure and a controller enclosure, in accordance with some implementations.

FIG. 4 is a functional block diagram 400 of a vehicle 412 including a vehicle pad enclosure 404 and a controller enclosure 422, in accordance with some implementations. In FIG. 4, the vehicle 412 is positioned for transfer of wireless charging power such that the vehicle pad enclosure 404 is located substantially over the base pad 402 enclosure. For the purpose of the present application, the term "enclosure" may be considered to mean any confining structure that is configurable to hold at least one electrical component in a separate, (e.g., disparate) location than electrical components in another such confining structure. For example, a box, container or compartment that completely or at least partially surrounds an electrical component may be considered an enclosure. However, such structures as printed circuit boards in and of themselves may not be considered enclosures for this purpose even though they have be a confining structure. Likewise, external compartments or containers of electrical components themselves, such as a plastic casing of integrated circuits, relays switches and the like would also not be considered enclosures for the purpose of this application. However, a container that holds a coil and a rectifier circuit at a substantially different location from another container that holds other related electrical components within a vehicle may be considered an enclosure. For example, one such advantage of dividing electrical components into separate enclosures is the division of thermal load between the enclosures.

The vehicle pad enclosure 404 includes a vehicle coupler (e.g., inductor), similar to that previously described in connection with any of FIGS. 1-3. However, substantially all other illustrated electronic components of the vehicle wireless power receiver system are located in the controller enclosure 442, which is located some distance from the vehicle pad enclosure 404. In such implementations, the electrical conductors connecting the vehicle pad enclosure 404 to the controller enclosure 442 are configured to provide an alternating current (AC) output to the controller enclosure 442 and the controller enclosure 442 is configured to provide a direct current (DC) output to a battery 418 of the vehicle 412. Thus, the controller enclosure 442 may include all receiver electronics except for the vehicle coupler itself (or the coupler and tuning capacitor(s)), which is located in the vehicle pad enclosure 404. This puts a high thermal load on the controller enclosure 442, since substantially all heat-producing components except for the vehicle coupler itself are located in the controller enclosure 442.

Figure 5:
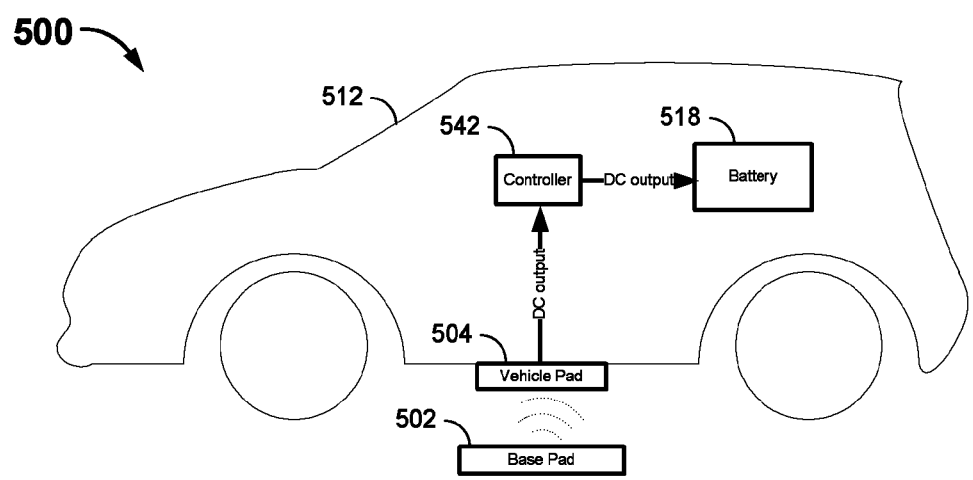
FIG. 5 is another functional block diagram of a vehicle including a vehicle pad enclosure and a controller enclosure, in accordance with some implementations.

FIG. 5 is another functional block diagram 500 of a vehicle 512 including a vehicle pad enclosure 504 and a controller enclosure 542, in accordance with some implementations. In FIG. 5, the vehicle 512 is positioned for transfer of wireless charging power such that the vehicle pad enclosure 504 is located substantially over the base pad 502 enclosure. The vehicle pad enclosure 504 includes a vehicle coupler (e.g., inductor), similar to that previously described in connection with any of FIGS. 1-3, as well as at least one additional component of a wireless charging power receiver system (e.g., a rectifier circuit). However, substantially all other illustrated electronic components of the vehicle wireless power receiver system are located in the controller enclosure 542, which is located some distance from the vehicle pad enclosure 504. In such implementations, since the vehicle pad enclosure 504 includes the at least one additional component of the wireless charging power receiver system for example, a rectifier circuit, the electrical conductors connecting the vehicle pad enclosure 504 to the controller enclosure 542 may be configured to provide a DC output to the controller enclosure 542. The controller enclosure 542 may also be configured to provide a controlled or modified DC output to a battery 518 of the vehicle 512. Thus, the controller enclosure 542 may include substantially all illustrated receiver electronics except for the vehicle coupler itself and the at least one additional component of the wireless charging power receiver system located in the vehicle pad enclosure 504, such that the vehicle pad enclosure 504 outputs a DC signal, rather than an AC signal. Among other advantages, the implementations according to FIG. 5 allow for DC connections between the vehicle pad 504 and controller 542 enclosures as well as splitting of the system's thermal load between the vehicle coupler enclosure 504 and the controller enclosure 542, since the major heat-producing components are distributed between the vehicle coupler enclosure 504 and the controller enclosure 542. In addition, since the vehicle pad enclosure 504 provides a DC output to the controller enclosure 542, the distance between the vehicle pad enclosure 504 and the controller enclosure 542 is not critical and may be more widely varied as compared to the similar components shown in FIG. 4.

FIG. 6A is a schematic diagram of an arrangement of components in each of a vehicle pad enclosure 604 and a controller enclosure 642 of a wireless charging power receiver 600A, in accordance with some implementations. The receiver 600A may comprise a parallel-tuned IPT receiver (e.g., the coupler 616 may comprise a parallel-tuned resonant circuit). The vehicle pad enclosure 604 includes a vehicle coupler 616 (e.g., an inductor), while the remainder of the illustrated components of the receiver 600A are distally located within the controller enclosure 642. The vehicle coupler enclosure 604 provides an AC output to the controller enclosure 642. For any of FIGS. 6A-6D, 7A-7D, 8A-8D, 9A-9D, 10A-10D, and 11A-11D, any circuitry located within the respective controller enclosures may comprise a controller circuit.

The controller enclosure receives the AC output and may include a resonance capacitor 620 connected in parallel with the vehicle coupler 616. The controller enclosure 642 additionally includes a rectifier circuit comprising a first diode 624 connected in series with a second diode 626 such that an anode of each is connected to a ground node 628 and cathodes of each are connected in parallel across the resonance capacitor 620. An anode of a third diode 630 is connected to the cathode of the first diode 624 and an anode of a fourth diode 632 is connected to the cathode of the second diode 626. The cathodes of each of the third 630 and fourth 632 diodes are connected to a first terminal of a DC inductor 634. The second terminal of the DC inductor 634 is connected to a first terminal of each of a smoothing capacitor 636 and a battery 618. A second terminal of each of the smoothing capacitor 636 and the battery 618 are connected to ground. The battery 618 may be located apart from the controller enclosure 642.

FIG. 6B is a schematic diagram of another arrangement of the components shown in FIG. 6A in each of a vehicle pad enclosure 604 and a controller enclosure 642 of a wireless charging power receiver 600B, in accordance with some implementations. The vehicle pad enclosure 604 includes the vehicle coupler 616 (e.g., an inductor), the resonance capacitor 620 and the rectifier circuit, comprising each of the first through fourth diodes 624, 626, 630, 632 connected as previously described in connection with FIG. 6A. The controller enclosure 642 then includes all remaining illustrated components of the receiver 600B. The output from the vehicle pad enclosure 604 is a DC output. The battery 618 may be located apart from the controller enclosure 642.

FIG. 6C is a schematic diagram of another arrangement of the components shown in FIG. 6A in each of a vehicle pad enclosure 604 and a controller enclosure 642 of a wireless charging power receiver 600C, in accordance with some implementations. The vehicle pad enclosure 604 includes the vehicle coupler 616 (e.g., an inductor), the resonance capacitor 620, the rectifier circuit, comprising each of the first through fourth diodes 624, 626, 630, 632 connected as previously described in connection with FIG. 6A, and the DC inductor 634. The controller enclosure 642 then includes all remaining illustrated components of the receiver 600B. The output from the vehicle pad enclosure 604 is a DC output. The battery 618 may be located apart from the controller enclosure 642.

FIG. 6D is a schematic diagram of another arrangement of the components shown in FIG. 6A in each of a vehicle pad enclosure 604 and a controller enclosure 642 of a wireless charging power receiver 600C, in accordance with some implementations. All illustrated components are present in FIG. 6D as previously described in connection with FIG. 6C with the exception that the DC inductor 634 may be split into two physically distinct DC inductors 634A, 634B connected in series, the DC inductor 634A is located in the vehicle pad enclosure 604 and the DC inductor 634B is located in the controller enclosure 642. In such implementations, the sum of the inductances of the DC inductors 634A, 634B may be substantially equal to the inductance of the DC inductor 634 shown in each of FIGS. 6A-6C.

FIG. 7A is a schematic diagram of an arrangement of components in each of a vehicle pad enclosure 704 and a controller enclosure 742 of a wireless charging power receiver 700A, in accordance with some implementations. The receiver 700A may have substantially the same arrangement as that previously described in connection with FIG. 6A, however, further including a control switch 746 and a fifth diode 744. Thus, each of the components 716, 720, 724, 726, 728, 730, 732, 734, 736 and 718 correspond to the components 616, 620, 624, 626, 628, 630, 632, 634, 636 and 618 of FIG. 6A, respectively. However, instead of the second terminal of the DC inductor 734 being connected to first terminals of each of the smoothing capacitor 736 and the battery 718 directly, the second terminal of the DC inductor 734 is connected to an anode of the fifth diode 744 and a first terminal of the switch 746 (e.g., drain terminal). A cathode of the fifth diode 744 is connected to the first terminals of each of the smoothing capacitor 736 and the battery 718. A second terminal of each of the smoothing capacitor 736 and the battery 718 is connected to ground. The second terminal of the switch 746 (e.g., drain terminal) is also connected to a ground connection. When enabled, the switch 746 is configured to discontinue provision of DC charging power to the battery 718. Thus, the receiver 700A has the added control aspect provided by the switch 746 and the fifth diode 744 as compared to the receiver 600A of FIG. 6A.

FIG. 7B is a schematic diagram of another arrangement of the components shown in FIG. 7A in each of a vehicle pad enclosure and a controller enclosure of a wireless charging power receiver 700B, in accordance with some implementations. The vehicle pad enclosure 704 includes the vehicle coupler 716 (e.g., an inductor), the resonance capacitor 720 and the rectifier circuit, comprising each of the first through fourth diodes 724, 726, 730, 732 connected as previously described in connection with FIG. 7A. The controller enclosure 742 then includes all remaining illustrated components of the receiver 700B. The output from the vehicle pad enclosure 704 is a DC output. The battery 718 may be located apart from the controller enclosure 742.

FIG. 7C is a schematic diagram of another arrangement of the components shown in FIG. 7A in each of a vehicle pad enclosure and a controller enclosure of a wireless charging power receiver 700C, in accordance with some implementations. The vehicle pad enclosure 704 includes the vehicle coupler 716 (e.g., an inductor), the resonance capacitor 720, the rectifier circuit, comprising each of the first through fourth diodes 724, 726, 730, 732 connected as previously described in connection with FIG. 7A, and the DC inductor 734. The controller enclosure 742 then includes all remaining illustrated components of the receiver 700B. The output from the vehicle pad enclosure 704 is a DC output. The battery 718 may be located apart from the controller enclosure 742.

FIG. 7D is a schematic diagram of another arrangement of the components shown in FIG. 7A in each of a vehicle pad enclosure 704 and a controller enclosure 742 of a wireless charging power receiver 700C, in accordance with some implementations. All illustrated components are present in FIG. 7D as previously described in connection with FIG. 7C with the exception that the DC inductor 734 may be split into two physically distinct DC inductors 734A, 734B connected in series, the DC inductor 734A is located in the vehicle pad enclosure 704 and the DC inductor 734B is located in the controller enclosure 742. In such implementations, the sum of the inductances of the DC inductors 734A, 734B may be substantially equal to the inductance of the DC inductor 734 shown in each of FIGS. 7A-7C.

FIG. 8A is a schematic diagram of an arrangement of components in each of a vehicle pad enclosure 804 and a controller enclosure 842 of a wireless charging power receiver 800A, in accordance with some implementations. The receiver 800A may comprise a current doubler circuit. The vehicle pad enclosure 804 includes a vehicle coupler 816 (e.g., an inductor), while the remainder of the illustrated components of the receiver 800A are distally located within the controller enclosure 842. The vehicle coupler enclosure 804 provides an AC output to the controller enclosure 842.

The controller enclosure receives the AC output and may include a resonance capacitor 820 connected in parallel with the vehicle coupler 816. The controller enclosure 842 additionally includes a rectifier circuit comprising a first diode 824 connected in series with a second diode 826 such that an anode of each is connected to a ground node 828 and cathodes of each are connected in parallel with the resonance capacitor 820. The anode of the first diode 824 is connected to a first terminal of a first DC inductor 834. The anode of the second diode 826 is connected to a first terminal of a second DC inductor 848. The second terminal of each of the first 834 and second 848 DC inductors is connected to an anode of a third diode 844. A cathode of the fifth diode 844 is connected to a first terminal of each of a smoothing capacitor 836 and a battery 818. A second terminal of each of the smoothing capacitor 836 and the battery 818 are connected to ground. The battery 818 may be located apart from the controller enclosure 842.

FIG. 8B is a schematic diagram of another arrangement of the components shown in FIG. 8A in each of a vehicle pad enclosure 804 and a controller enclosure 842 of a wireless charging power receiver 800B, in accordance with some implementations. The vehicle pad enclosure 804 includes the vehicle coupler 816 (e.g., an inductor), the resonance capacitor 820 and the rectifier circuit comprising the first and second diodes 824, 826 connected as previously described in connection with FIG. 8A. The controller enclosure 842 then includes all remaining illustrated components of the receiver 800B. The output from the vehicle pad enclosure 804 is a DC output. The battery 818 may be located apart from the controller enclosure 842. As compared to the implementations shown in FIGS. 6A-6C and 7A-7C, the implementations shown in FIGS. 8B and 8C have reduced diode losses since there are fewer diodes, which also reduces the thermal load in the vehicle pad enclosure 804.

FIG. 8C is a schematic diagram 800C of another arrangement of the components shown in FIG. 8A in each of a vehicle pad enclosure and a controller enclosure of a wireless charging power receiver, in accordance with some implementations. The vehicle pad enclosure 804 includes the vehicle coupler 816 (e.g., an inductor), the resonance capacitor 820, the rectifier circuit comprising the first and second diodes 824, 826 connected as previously described in connection with FIG. 8A, and the DC inductors 834, 848. The controller enclosure 842 then includes all remaining illustrated components of the receiver 800C. The output from the vehicle pad enclosure 804 is a DC output. The battery 818 may be located apart from the controller enclosure 842.

FIG. 8D is a schematic diagram of another arrangement of the components shown in FIG. 8A in each of a vehicle pad enclosure 804 and a controller enclosure 842 of a wireless charging power receiver 800C, in accordance with some implementations. All illustrated components are present in FIG. 8D as previously described in connection with FIG. 8C with the exception that the DC inductors 834, 848 may be split into two physically distinct DC inductors 834A, 834B and 848A, 848B, respectively, connected in series. The DC inductors 834A, 848A are located in the vehicle pad enclosure 804 and the DC inductors 834B, 848B are located in the controller enclosure 842. In such implementations, the sum of the inductances of the DC inductors 834A, 834B may be substantially equal to the inductance of the DC inductor 834, while the sum of the inductances of the DC inductors 848A, 848B may be substantially equal to the inductance of the DC inductor 848, as shown in each of FIGS. 8A-8C.

FIG. 9A is a schematic diagram of an arrangement of components in each of a vehicle pad enclosure 904 and a controller enclosure 942 of a wireless charging power receiver 900A, in accordance with some implementations. The receiver 900A may have substantially the same arrangement as that previously described in connection with FIG. 8A, however, further including a control switch 946. Thus, each of the components 916, 920, 924, 926, 928, 934, 936, 944, 948, and 918 correspond to the components 816, 820, 824, 826, 828, 834, 836, 844, 848, and 818 of FIG. 8A. In addition, a first terminal of the switch 946 is connected between the second terminal of each of the first 934 and second 948 DC inductors and ground. When enabled, the switch 946 is configured to discontinue provision of DC charging power to the battery 918. Thus, the receiver 900A has the added control aspect provided by the switch 946 as compared to the receiver 800A of FIG. 8A.

FIG. 9B is a schematic diagram of another arrangement of the components shown in FIG. 9A in each of the vehicle pad enclosure 904 and the controller enclosure 942 of a wireless charging power receiver 900B, in accordance with some implementations. The vehicle pad enclosure 904 includes the vehicle coupler 916 (e.g., an inductor), the resonance capacitor 920 and the rectifier circuit comprising each of the first and second diodes 924, 926 connected as previously described in connection with FIG. 9A. The controller enclosure 942 then includes all remaining illustrated components of the receiver 900B. The output from the vehicle pad enclosure 904 is a DC output. The battery 918 may be located apart from the controller enclosure 942.

FIG. 9C is a schematic diagram of another arrangement of the components shown in FIG. 9A in each of the vehicle pad enclosure 904 and the controller enclosure 942 of a wireless charging power receiver 900C, in accordance with some implementations. The vehicle pad enclosure 904 includes the vehicle coupler 916 (e.g., an inductor), the resonance capacitor 920, the rectifier circuit comprising each of the first and second diodes 924, 926 connected as previously described in connection with FIG. 9A, and the DC inductor 934. The controller enclosure 942 then includes all remaining illustrated components of the receiver 900B. The output from the vehicle pad enclosure 904 is a DC output. The battery 918 may be located apart from the controller enclosure 942.

FIG. 9D is a schematic diagram of another arrangement of the components shown in FIG. 9A in each of a vehicle pad enclosure 904 and a controller enclosure 942 of a wireless charging power receiver 900C, in accordance with some implementations. All illustrated components are present in FIG. 9D as previously described in connection with FIG. 9C with the exception that the DC inductors 934, 948 may be split into two physically distinct DC inductors 934A, 934B and 948A, 948B, respectively, connected in series. The DC inductors 934A, 948A are located in the vehicle pad enclosure 904 and the DC inductors 934B, 948B are located in the controller enclosure 942. In such implementations, the sum of the inductances of the DC inductors 934A, 934B may be substantially equal to the inductance of the DC inductor 934, while the sum of the inductances of the DC inductors 948A, 948B may be substantially equal to the inductance of the DC inductor 948, as shown in each of FIGS. 9A-9C.

FIG. 10A is a schematic diagram of an arrangement of components in each of a vehicle pad enclosure 1004 and a controller enclosure 1042 of a wireless charging power receiver 1000A, in accordance with some implementations. The receiver 1000A may comprise a partial series-tuned current doubler circuit. The vehicle pad enclosure 1004 includes a vehicle coupler 1016 (e.g., an inductor), while the remainder of the illustrated components of the receiver 1000A are distally located within the controller enclosure 1042. The vehicle coupler enclosure 1004 provides an AC output to the controller enclosure 1042.

The controller enclosure receives the AC output and may include a first resonance capacitor 1050 having a first terminal connected to a first terminal of the coupler 1016 and a second terminal connected to a first terminal of each of a switch 1054, a second 1020 resonance capacitor 1020 and a first DC inductor 1034. A second terminal of the coupler 1016 may be connected to each of a second terminal of the switch 1054, a second terminal of the second resonance capacitor 1020 and a first terminal of a second DC inductor 1048. The controller enclosure 1042 additionally includes a rectifier circuit comprising a first diode 1024 connected in series with a second diode 1026 such that an anode of each is connected to a ground node 1028 and cathodes of each are connected in parallel with the second resonance capacitor 1020. The second terminal of each of the first 1034 and second 1048 DC inductors is connected to an anode of a third diode 1044. A cathode of the third diode 1044 is connected to a first terminal of each of a smoothing capacitor 1036 and a battery 1018. A second terminal of each of the smoothing capacitor 1036 and the battery 1018 are connected to ground. The battery 1018 may be located apart from the controller enclosure 1042. Thus, by closing or opening the switch 1054, DC charging power provision to the battery 1016 may be disabled or enabled, respectively.

FIG. 10B is a schematic diagram of another arrangement of the components shown in FIG. 10A in each of a vehicle pad enclosure 1004 and a controller enclosure 1042 of a wireless charging power receiver 1000B, in accordance with some implementations. The vehicle pad enclosure 1004 includes the vehicle coupler 1016 (e.g., an inductor), the first resonance capacitor 1050, the second resonance capacitor 1020, the switch 1054 and the rectifier circuit comprising the first and second diodes 1024, 1026 connected as previously described in connection with FIG. 10A. The controller enclosure 1042 then includes all remaining illustrated components of the receiver 1000B. The output from the vehicle pad enclosure 1004 is a DC output. The battery 1018 may be located apart from the controller enclosure 1042.

FIG. 10C is a schematic diagram of another arrangement of the components shown in FIG. 10A in each of a vehicle pad enclosure 1004 and a controller enclosure 1042 of a wireless charging power receiver 1000C, in accordance with some implementations. The vehicle pad enclosure 1004 includes the vehicle coupler 1016 (e.g., an inductor), the first resonance capacitor 1050, the second resonance capacitor 1020, the switch 1054 and the rectifier circuit comprising the first and second diodes 1024, 1026 connected as previously described in connection with FIG. 10A, and the first and second DC inductors 1034, 1048. The controller enclosure 1042 then includes all remaining illustrated components of the receiver 1000C. The output from the vehicle pad enclosure 1004 is a DC output. The battery 1018 may be located apart from the controller enclosure 1042. Although two conductors are shown connecting the vehicle pad enclosure 1004 and the controller enclosure 1042, the second terminal of each of the first 1034 and second 1048 DC inductors may be connected to each other in the vehicle pad enclosure 1004 and only a single conductor may extend between the vehicle pad enclosure 1004 and the controller enclosure 1042.

FIG. 10D is a schematic diagram of another arrangement of the components shown in FIG. 10A in each of a vehicle pad enclosure 1004 and a controller enclosure 1042 of a wireless charging power receiver 1000C, in accordance with some implementations. All illustrated components are present in FIG. 10D as previously described in connection with FIG. 10C with the exception that the DC inductors 1034, 1048 may be split into two physically distinct DC inductors 1034A, 1034B and 1048A, 1048B, respectively, connected in series. The DC inductors 1034A, 1048A are located in the vehicle pad enclosure 1004 and the DC inductors 1034B, 1048B are located in the controller enclosure 1042. In such implementations, the sum of the inductances of the DC inductors 1034A, 1034B may be substantially equal to the inductance of the DC inductor 1034, while the sum of the inductances of the DC inductors 1048A, 1048B may be substantially equal to the inductance of the DC inductor 1048, as shown in each of FIGS. 10A-10C.

FIG. 11A is a schematic diagram of another arrangement of components in each of a vehicle pad enclosure 1104 and a controller enclosure 1142 of a wireless charging power receiver 1100A, in accordance with some implementations. The receiver 1100A may comprise an interleaved current doubler circuit. The vehicle pad enclosure 1104 includes a vehicle coupler 1116 (e.g., an inductor), while the remainder of the components of the receiver 1100A shown are distally located within the controller enclosure 1142. The vehicle coupler enclosure 1104 provides an AC output to the controller enclosure 1142.

The controller enclosure 1142 receives the AC output and may include a resonance capacitor 1120 connected in parallel with the vehicle coupler 1116. The controller enclosure 1142 additionally includes a rectifier circuit comprising a first diode 1124 connected in series with a second diode 1126 such that an anode of each is connected to a ground node 1128 and a cathode of each is connected in parallel across the resonance capacitor 1120. The cathode of the first diode 1124 is connected to a first terminal of a first DC inductor 1134. The cathode of the second diode 1126 is connected to a second terminal of a second DC inductor 1148. A second terminal of the first DC inductor 1134 is connected to a first terminal of each of a third diode 1144 and a first switch 1146 (e.g., a drain terminal). A second terminal of the second DC inductor 1148 is connected to an anode of a fourth diode 1152 and a first terminal of a second switch 1150 (e.g., a drain terminal). A second terminal of each of the first 1146 and second 1150 switches (e.g., a source terminal) is connected to ground. A cathode of each of the third 1144 and fourth 1152 diodes are connected to a first terminal of each of a smoothing capacitor 1136 and a battery 1118. A second terminal of each of the smoothing capacitor 1136 and the battery 1118 are connected to ground. The battery 1118 may be located apart from the controller enclosure 1142.

FIG. 11B is a schematic diagram of another arrangement of the components shown in FIG. 11A in each of a vehicle pad enclosure 1104 and a controller enclosure 1142 of a wireless charging power receiver 1100B, in accordance with some implementations. The vehicle pad enclosure 1104 includes the vehicle coupler 1116 (e.g., an inductor), the resonance capacitor 1120 and the rectifier circuit comprising the first and second diodes 1124, 1126 connected as previously described in connection with FIG. 11A. The controller enclosure 1142 then includes all remaining illustrated components of the receiver 1100B. The output from the vehicle pad enclosure 1104 is a DC output. The battery 1118 may be located apart from the controller enclosure 1142.

FIG. 11C is a schematic diagram of another arrangement of the components shown in FIG. 11A in each of a vehicle pad enclosure 1104 and a controller enclosure 1142 of a wireless charging power receiver 1100C, in accordance with some implementations. The vehicle pad enclosure 1104 includes the vehicle coupler 1116 (e.g., an inductor), the resonance capacitor 1120, the rectifier circuit comprising the first and second diodes 1124, 1126 connected as previously described in connection with FIG. 11A, and the first 1134 and second 1148 DC inductors. The controller enclosure 1142 then includes all remaining illustrated components of the receiver 1100C. The output from the vehicle pad enclosure 1104 is a DC output. The battery 1118 may be located apart from the controller enclosure 1142. As compared to the implementations shown in FIGS. 8A-8C, 9A-9C, and 10A-10C the implementations shown in FIGS. 11A-11C may provide an increased switching frequency and efficiency.

FIG. 11D is a schematic diagram of another arrangement of the components shown in FIG. 11A in each of a vehicle pad enclosure 1104 and a controller enclosure 1142 of a wireless charging power receiver 1100C, in accordance with some implementations. All illustrated components are present in FIG. 11D as previously described in connection with FIG. 11C with the exception that the DC inductors 1134, 1148 may be split into two physically distinct DC inductors 1134A, 1134B and 1148A, 1148B, respectively, connected in series. The DC inductors 1134A, 1148A are located in the vehicle pad enclosure 1104 and the DC inductors 1134B, 1148B are located in the controller enclosure 1142. In such implementations, the sum of the inductances of the DC inductors 1134A, 1134B may be substantially equal to the inductance of the DC inductor 1134, while the sum of the inductances of the DC inductors 1148A, 1148B may be substantially equal to the inductance of the DC inductor 1148, as shown in each of FIGS. 11A-11C.

As compared to implementations where all receiver control circuitry is fully integrated in a same enclosure, with or without the receive coupler itself, the implementations previously described in connection with any of FIGS. 5, 6B-6D, 7B-7D, 8B-8D, 9B-9D, 10B-10D and 11B-11D may provide more flexible component locations and improved thermal loss distribution between the respective vehicle coupler enclosures and the controller enclosures. Since the output of the vehicle coupler enclosure is a direct current rather than an alternating current, less expensive interconnects may be utilized, as AC rated interconnects are much more expensive and much less readily available as compared to DC rated interconnects. Moreover, less expensive cables (e.g., replacing Litz wire) and more convenient cable entry/exit positions may be utilized. Moreover, the direct currents have substantially reduced electromagnetic interference and emissions as compared to alternating currents. In addition, since the physical dimension of components such as the DC inductors tend to scale with power rating, including such components in a separate enclosure from a controller enclosure may allow for the use of a generic controller for a wide range of rated wireless power reception applications.

However, without some additional control mechanisms, the implementations shown in FIGS. 7A-7D, 9A-9D, 10A-10D and 11A-11D may have increased probability of over-voltage faults caused when a transmitter is driven while being magnetically coupled with an unloaded vehicle coupler (e.g., coupler 716), as would occur when the respective switch disengages the battery (e.g., battery 718). In addition, for the current doubler implementations of FIGS. 8A-8D, 9A-9D, 10A-10D, and 11A-11D, any AC ripple on the DC outputs would have a doubled frequency as compared to FIGS. 6A-6D and 7A-7D.

Figure 12:
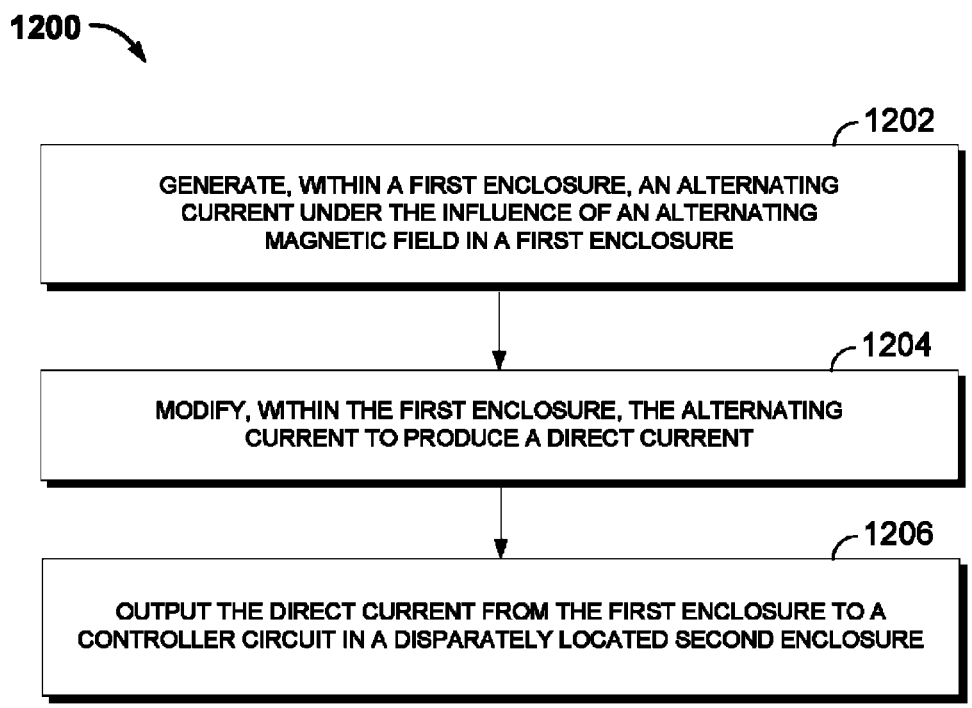
FIG. 12 is a flowchart depicting a method for wirelessly receiving charging power, in accordance with some implementations.

FIG. 12 is a flowchart 1200 depicting a method for wirelessly receiving charging power, in accordance with some implementations. The method of flowchart 1200 is described herein with reference to any of the receiver implementations previously described in connection with FIGS. 4, 5, 6B-6D, 7B-7D, 8B-8D, 9B-9D, 10B-10D, and 11B-11D. In some implementations, one or more of the blocks in flowchart 1200 may be performed by one or more of a coupler, a rectifier circuit, and/or a controller circuit as previously described in any of FIGS. 4, 5, 6B-6D, 7B-7D, 8B-8D, 9B-9D, 10B-10D, and 11B-11D. Although the method of flowchart 1200 is described herein with reference to a particular order, in various implementations, blocks herein may be performed in a different order, or omitted, and additional blocks may be added.

The flowchart 1200 may start with block 1202, which includes generating, within a first enclosure, an alternating current under the influence of an alternating magnetic field. For example, as previously described in connection with any of FIGS. 6B-6D, 7B-7D, 8B-8D, 9B-9D, 10B-10D, and 11B-11D, the coupler 616, 717, 816, 916, 1016, and 1116 may generate an alternating current under the influence of an alternating magnetic field generated by a transmit coupler. The coupler may be located in a first enclosure 604, 704, 804, 904, 1004, 1104.

The flowchart 1200 may then advance to block 1204, which includes modifying, within the first enclosure, the alternating current to produce a direct current. For example, as previously described in connection with any of FIGS. 6B-6D, 7B-7D, 8B-8D, 9B-9D, 10B-10D, and 11B-11D, the rectifier circuit may modify an alternating current received from the coupler 616, 717, 816, 916, 1016, and 1116.

The flowchart 1200 may then advance to block 1206, which includes outputting the direct current from the first enclosure to a controller circuit in a disparately located second enclosure. For example, as previously described in connection with any of FIGS. 6B-6D, 7B-7D, 8B-8D, 9B-9D, 10B-10D, and 11B-11D, the direct current from the rectifier circuit may be output from the first enclosure 604, 704, 804, 904, 1004, 1104 to a controller circuit located in a second enclosure 642, 742, 842, 942, 1042, 1142.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. For example, first enclosing means may comprise the enclosure 504, 604, 704, 804, 904, 1004, and 1104 as previously described in connection with any of FIGS. 6B-6D, 7B-7D, 8B-8D, 9B-9D, 10B-10D, and 11B-11D. Second enclosing means may comprise the enclosure 542, 642, 742, 842, 942, 1042, and 1142 as previously described in connection with any of FIGS. 6B-6D, 7B-7D, 8B-8D, 9B-9D, 10B-10D, and 11B-11D. The means for generating an alternating current may comprise at least a coupler as previously described in connection with any of FIGS. 6B-6D, 7B-7D, 8B-8D, 9B-9D, 10B-10D, and 11B-11D. Means for modifying the alternating current may comprise at least a rectifier circuit as previously described in connection with any of FIGS. 6B-6D, 7B-7D, 8B-8D, 9B-9D, 10B-10D, and 11B-11D. Means for controlling the apparatus may comprise at least the controller circuit as previously described in connection with any of FIGS. 6B-6D, 7B-7D, 8B-8D, 9B-9D, 10B-10D, and 11B-11D. Means for receiving the direct current may comprise at least one direct current inductor as previously described in connection with any of FIGS. 6B-6D, 7B-7D, 8B-8D, 9B-9D, 10B-10D, and 11B-11D.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory, computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media.

For purposes of summarizing the disclosure, certain aspects, advantages and novel features of the implementations have been described herein. It is to be understood that not necessarily all such advantages may be achieved in accordance with any particular implementation. Thus, the implementations may be embodied or carried out in a manner that achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the present application. Thus, the present application is not intended to be limited to the implementations shown herein but is to be accorded the widest scope consistent with the principles and novel features disclosed herein.

What is claimed is:

1. An apparatus for wirelessly receiving charging power, the apparatus comprising:
   a first enclosure including at least:
      a receive coupler configured to generate an alternating current under the influence of an alternating magnetic field; and
      a rectifier circuit configured to modify the alternating current to produce a direct current for output from the first enclosure to a controller circuit in a disparately located second enclosure.

2. The apparatus of claim 1, further comprising at least one direct current inductor configured to receive the direct current from the rectifier circuit.

3. The apparatus of claim 2, wherein the at least one direct current inductor is located in the first enclosure.

4. The apparatus of claim 2, wherein the at least one direct current inductor is located in the second enclosure.

5. The apparatus of claim 1, further comprising the second enclosure including the controller circuit.

6. The apparatus of claim 1, wherein the controller circuit is configured to selectively provide the direct current to a battery.

7. The apparatus of claim 1, wherein electrical components in the first enclosure and the second enclosure comprise a parallel-tuned resonant circuit.

8. The apparatus of claim 1, wherein electrical components in the first enclosure and the second enclosure comprise a current doubler circuit.

9. The apparatus of claim 1, wherein electrical components in the first enclosure and the second enclosure comprise an interleaved current doubler circuit.

10. A method for wirelessly receiving charging power, the method comprising:
    generating, within a first enclosure, an alternating current under the influence of an alternating magnetic field,
    modifying, via a rectifier circuit within the first enclosure, the alternating current to produce a direct current, and
    outputting the direct current from the first enclosure to a controller circuit in a disparately located second enclosure.

11. The method of claim 10, further comprising selectively providing the direct current to a battery via the controller circuit.

12. The method of claim 10, wherein electrical components in the first enclosure and the second enclosure comprise a parallel-tuned resonant circuit.

13. The method of claim 10, wherein electrical components in the first enclosure and the second enclosure comprise a current doubler circuit.

14. The method of claim 10, wherein electrical components in the first enclosure and the second enclosure comprise an interleaved current doubler circuit.

15. A non-transitory, computer-readable medium comprising computer program code that, when executed by an apparatus, causes the apparatus to:
    generate, within a first enclosure, an alternating current under the influence of an alternating magnetic field,
    modify, via a rectifier circuit within the first enclosure, the alternating current to produce a direct current, and
    output the direct current from the first enclosure to a controller circuit in a disparately located second enclosure.

16. The medium of claim 15, wherein the code, when executed, further causes the apparatus to selectively provide the direct current to a battery via the controller circuit.

17. The medium of claim 15, wherein electrical components in the first enclosure and the second enclosure comprise a parallel-tuned resonant circuit.

18. The medium of claim 15, wherein electrical components in the first enclosure and the second enclosure comprise a current doubler circuit.

19. The medium of claim 15, wherein electrical components in the first enclosure and the second enclosure comprise an interleaved current doubler circuit.

20. An apparatus for wirelessly receiving charging power, the apparatus comprising:
    first enclosing means enclosing at least:
       means for generating an alternating current under the influence of an alternating magnetic field; and
       means for modifying the alternating current to produce a direct current for output from the first enclosing means to means for controlling the apparatus, the means for controlling the apparatus being disposed in disparately located second enclosing means.

21. The apparatus of claim 20, further comprising means for receiving the direct current from the means for modifying the alternating current.

22. The apparatus of claim 21, wherein the means for receiving the direct current is enclosed by the first enclosing means.

23. The apparatus of claim 21, wherein the means for receiving the direct current is enclosed by the second for enclosing at least one electrical component.

24. The apparatus of claim 20, further comprising the means for controlling the apparatus.

25. The apparatus of claim 20, wherein electrical components in the first enclosing means and the second enclosing means comprise a parallel-tuned resonant circuit.

26. The apparatus of claim 20, wherein electrical components in the first enclosing means and the second enclosing means comprise a current doubler circuit.

27. The apparatus of claim 20, wherein electrical components in the first enclosing means and the second enclosing means comprise an interleaved current doubler circuit.

28. The apparatus of claim 20, wherein the means for generating an alternating current comprises a receive coupler.

29. The apparatus of claim 20, wherein the means for modifying the alternating current comprises a rectifier circuit.

30. The apparatus of claim 20, wherein the means for controlling the apparatus comprises a controller circuit.

* * * * *